Figure 1:
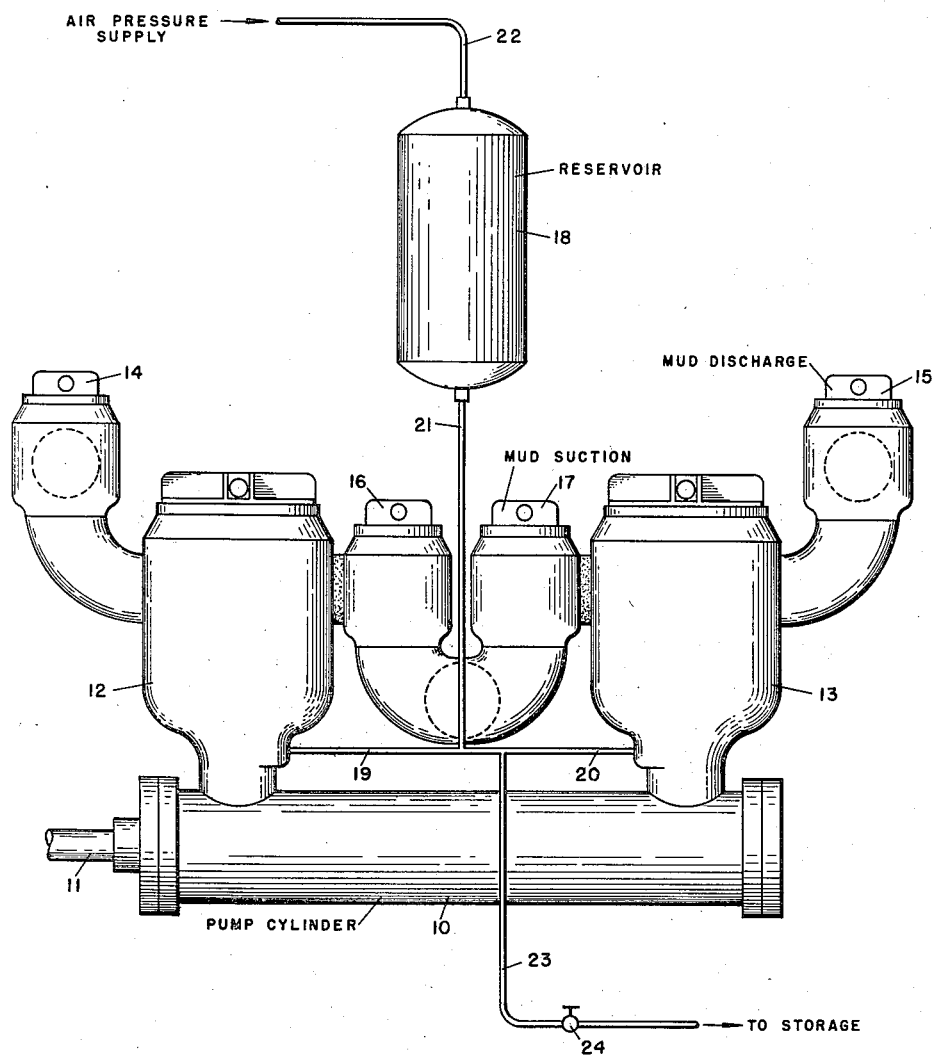

United States Patent Office 2,927,431
Patented Mar. 8, 1960

2,927,431

VALVE FOR DIAPHRAGM PUMP

William A. Pitts, Bellaire, Tex., assignor, by mesne assignments, to Jersey Production Research Company, Tulsa, Okla., a corporation of Delaware Application March 19, 1958, Serial No. 722,479

4 Claims. (Cl. 60—54.5)

This invention is directed to an intermediary fluid valve for a diaphragm pump.

The wearing portion of conventional mud pumps employed in oil well operations are in constant contact with the abrasive mud fluid being pumped which causes extremely short service life for the movable parts, such as the piston rods, liners, pistons and rod packing. To exclude abrasive fluid from the movable parts a flexible diaphragm employing make-up and relief valves for the intermediary fluid or fluid piston may be employed. A construction of this type is disclosed and claimed in U.S. Patent No. 2,811,925, entitled, "Device for Transmitting Pressure and Pumping Fluids" by Robert R. Crookston and U.S. Patent No. 2,778,315, entitled "Pump for Abrasive Fluids" by Robert R. Crookston and Leon Blagg. In this construction intermediary fluid is supplied, from a pressurized reservoir through a drilled passage in the casting housing the diaphragm, to a make-up valve. This valve is actuated when there is need for intermediary make-up fluid by a portion of the valve contacting an element of the diaphragm when the diaphragm is collapsed. A release valve mounted on the diaphragm and located in the abrasive fluid stream being pumped serves to release excess intermediary fluid to the fluid being pumped by a portion of the valve contacting the housing when the diaphragm is expanded.

The present invention utilizes a closed intermediary fluid system having a mechanically operated fluid valve which is operated only when movement of the diaphragm has exceeded its predetermined limits of travel. The same valve permits make-up fluid to flow from the intermediary fluid reservoir to the undercharged diaphragm or from the overcharged diaphragm back to the reservoir. Since there is little or no loss of fluid in the closed system the cost of the intermediary fluid is minimized. Factors such as lubricating quality, vapor pressure and freezing temperatures control the choice of the fluid used.

Briefly, certain objects of the invention are to provide an intermediary fluid valve for a diaphragm pump wherein; the intermediary fluid is not lost; the fluid being pumped is not contaminated; the valve is not exposed to the fluid being pumped; the expulsion of excess fluid is not dependent upon differential pressure across the diaphragm; and the diaphragm cover plate, the diaphragm, and valve are held in a guided path.

Briefly, the invention comprises a valve assembly arranged in a chamber and having a fluid reservoir connected thereto, said valve assembly being provided with movable means having first, second, and third positions, fluid movement between said reservoir and said chamber being prevented when said movable means is in said first position, fluid movement from said reservoir to said chamber being permitted and fluid movement from said chamber to said reservoir being prevented when said movable means is in said second position and fluid movement from said chamber to said reservoir being permitted when said movable means is in said third position.

Figure 2:
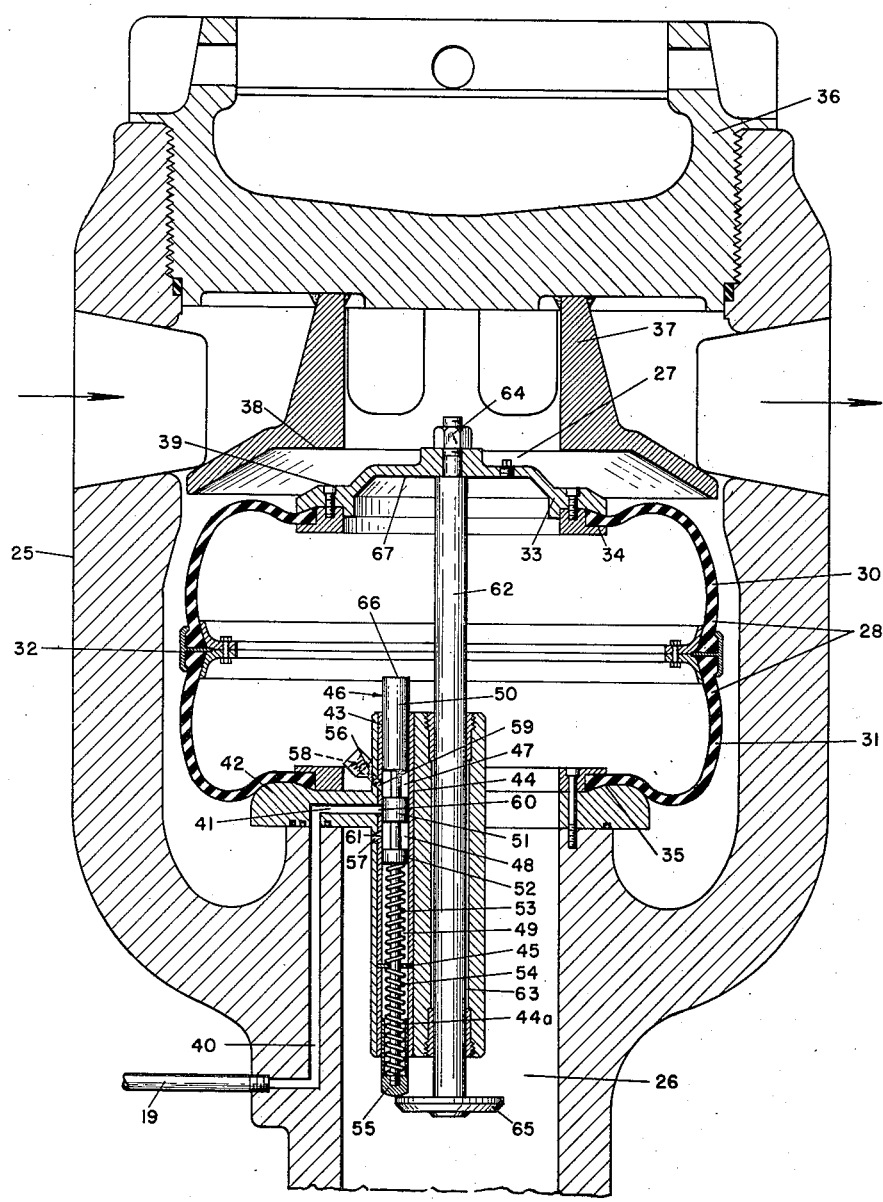

The above objects and other objects of the invention will be apparent from a description of the invention taken in conjunction with the drawing wherein:

Fig. 1 is a schematic view of a diaphragm pump assembly employing the valve arrangement according to the invention; and Fig. 2 is a partly sectional view of a diaphragm housing illustrating the valve of the present invention.

For a more complete understanding of the invention reference to the drawing in greater detail will now be made.

In Fig. 1 is shown a pump cylinder 10 in which is slidably arranged a piston and rod assembly 11. Connected to each end of pump cylinder 10 are diaphragm housings 12 and 13, respectively, the details of which are shown in Fig. 2. Connected to one side of diaphragm housings 12 and 13 are mud discharge valve assemblies 14 and 15, respectively, and connected to the other side of diaphragm housings 12 and 13 are mud suction or inlet valve assemblies 16 and 17, respectively. The piston fluid or intermediary fluid side of diaphragm housings 12 and 13 are connected to conduits 19 and 20, respectively, which, in turn, connect to an intermediary fluid reservoir 18 by means of conduit 21. Reservoir 18, in which is maintained an air-oil barrier, is connected to an air pressure supply via conduit 22. A conduit 23 provided with a valve 24 connects conduits 19, 20 and 21 to an intermediary fluid storage, not shown.

The details of the diaphragm housing 12 (or 13) are more clearly shown in Fig. 2. A diaphragm casing or housing 25 is provided with an opening 26 which fluidly communicates with an inlet and outlet intermediary fluid passage and an opening 27 which fluidly communicates with an inlet and outlet pumped fluid passage. A flexible diaphragm 28 is arranged in housing 25 and is formed by upper and lower halves 30 and 31, respectively. The two halves are connected together by means of a rigid ring member 32. The upper end of upper diaphragm half 30 is connected to a diaphragm cover plate 33, as indicated at 34, and the lower end of lower diaphragm half 31 is connected to the lower internal portion of housing 25, as indicated at 35, whereat a valve body 42 to be described is arranged. The upper portion of housing 25 is provided with a diaphragm pot cover 36 to which is connected a striker plate 37. The lower side 38 of striker plate 37 engages the upper side 39 of diaphragm cover plate 33 when diaphragm 28 is sufficiently extended or inflated.

Housing 25 is formed to provide a fluid passage 40, which passage is adapted to fluidly communicate with conduit 19 (or 20) at one end thereof, which, in turn, connects to reservoir 18. The other end of conduit 40 fluidly communicates with a conduit 41 provided in valve body or assembly 42 connected to housing 25, as shown. Valve body 42 is also provided with an opening 43 in which is positioned a sealing sleeve 44 suitably ported, a spacer sleeve 44a and a positioning washer 45. A valve spool 46 provided with recessed portions 47, 48, and 49 forming enlarged surfaces 50, 51, and 52 sealingly engaging bearing sleeve 44 is slidably arranged in opening 43. A spring 53 is arranged about valve spool 46 between washer 45 and surface 52 adapted to bias valve spool 46 upwardly and a spring 54 is arranged about valve spool 46 between washer 45 and the enlarged lower valve stem end or cap 55 of valve spool 46 adapted to bias valve spool 46 downwardly. Valve body 42 is provided with openings 56 and 57 located above and below passage 41, respectively. A check valve 58 which permits fluid flow to the interior of diaphragm 28 but prevents fluid flow from the interior of diaphragm 28 is arranged in opening 56. Sleeve 44 is provided with openings 59, 60 and 61 which fluidly communicate with opening 56, passage 41 and opening 57 in valve body 42, respectively. A diaphragm guide rod 62 is slidably arranged in an opening 63 formed in valve body 42. Guide rod 62 is secured at one end 64 to diaphragm cover plate 33 and is provided at the other end with a flange 65 which is adapted to engage end 55 of spool 46. The other end 66 of valve spool 46 is adapted to contact the underside surface 67 of cover plate 33.

*In operation*

Referring to Figs. 1 and 2, reciprocation of the piston assembly 11 in pump cylinder 10 forces the intermediary fluid alternately into and out of diaphragm valve housings 12 and 13, respectively, which causes reciprocation of diaphragms 28 in their respective housings, which, in turn, causes the fluid being pumped to enter the diaphragm housings 25 and to be discharged therefrom. In the neutral position shown in Fig. 2 surface 51 seals off fluid communication between passage 41 and opening 60 to either recess 47 or 48. However, movement of valve spool 46 downwardly fluidly communicates check valve 58 in opening 56 with passage 41 through opening 60 and recess 47. Similarly, upward movement of valve spool 46 fluidly communicates opening 57 and passage 41 through opening 61 and recess 48. As long as the cyclic displacement of the reciprocating piston and the charge of the intermediary fluid in the system is proper for desired expansion and contraction of diaphragm 28, valve spool 46 will not be engaged and moved from above by surface 67 of diaphragm cover plate 33 contacting end 66 of valve spool 46 or from below by flange 65 contacting the lower end 55 of valve spool 46 and springs 53 and 54 maintain valve spool 46 in the neutral position shown. The pump would operate this way indefinitely if neither of these conditions changed. However, in actual practice, both of these conditions may change. A variable stroke pump such as the duplex steam-driven mud pump on a drilling rig is an example of a piston pump which may have a change of displacement from stroke to stroke, and require frequent adjustments in the intermediary fluid charge. In addition to the above, leaks may occur in the diaphragms or associated joints or fastenings, or at the piston or piston rod gland of the piston assembly or at the intermediary fluid slide valve, all of which would require automatic and continuous adjustments in the charge of the intermediary fluid in the system.

In the event the leak is in only one direction past the piston of a double acting pump, it will starve the side it leaks from and over-charge the other end. However, if the intermediary fluid systems of both ends of the piston cylinder are connected to a common reservoir, as shown in Fig. 1, then the fluid will be returned to the reservoir without loss to continue the cycle and the system remains closed.

Therefore, assuming that one of the leaks described above exists which causes a reduction in the charge of the intermediary fluid, during the suction stroke the diaphragm 28 collapses and diaphragm guide rod 62 and diaphragm cover plate 33 connected thereto over-travel downwardly because of the shortage of intermediary fluid. By this action the underside surface 67 of cover plate 33 engages the upper end 66 of valve spool 46 and moves it downward causing recess 47 of valve spool 46 to interconnect passage 41 and check valve 58. In this position of valve spool 46, the intermediary fluid flows from pressurized reservoir 18 through conduits 21 and 20 or 19 and through passages 40 and 41, opening 60, recess 47, opening 59, and check valve 58 into the low pressure interior of diaphragm 28 to increase the intermediary fluid charge within diaphragm 28. This fluid adjustment takes place at the end of the suction stroke and check valve 58 prevents reverse flow of the fluid when the subsequent discharge stroke begins a split second later and before diaphragm cover plate 33 can release slide valve spool 46 so that spring 53 can close passage 41. On the other hand, if the system is overcharged with intermediary fluid, then during the discharge stroke of the piston, diaphragm 28 overtravels upwardly and flange 65 engages end 55 of valve spool 46 moving valve spool 46 upwardly sufficiently to interconnect passages 41 and opening 57. This occurs during the discharge stroke of the pump and the discharge pressure of the pump overcomes the reservoir pressure and fluid flows from the interior of diaphragm 28 through openings 57, 61, recess 48, opening 60 and passages 41, 40 and 19 or 20 into reservoir 18.

The required pressure differential between the reservoir and the intermediary fluid chamber of the pump to transfer the fluid obviously depends on a number of factors; however, as an example of the spread between the two pressures that can be tolerated, a pressure of 100 p.s.i.g. has been used on the fluid reservoir of a mud pump undergoing field tests while the pump discharge pressure was 2,500 p.s.i.g., and the suction charge pressure about 60 p.s.i.g.

Thus, as noted supra, the invention overcomes disadvantages in that the intermediary fluid which may be a considerable item of expense is not lost. The invention also avoids contamination of the fluid being pumped. This is an important consideration if the taste, color, or chemical balance of the material being pumped is critical. In the case of mud pumps utilized for pumping drilling mud streams such contamination may be unacceptable.

Additionally, this invention is advantageous in that the release or relief valve is not exposed to the fluid being pumped. Where the fluid being pumped is abrasive, corrosive, etc., the service life of the relief valve is shortened and losses of intermediary fluid are increased. The action of the valve is not dependent upon differential pressure across the diaphragm to expel excess fluid. In the event of large volume adjustments, where action of the valve is dependent upon differential pressure across the diaphragm, the fluid relief may not be adequate to prevent the rupture of the diaphragm. Further, the valve arrangement, described herein, provides a guide stem to hold the diaphragm cover plate and valve in a guided path. Absence of a guide system for the diaphragm cover plate and valve may result in a damaged and malfunctioning valve which may cause rupture of the diaphragm. Additionally, wobbling and sagging of an unguided diaphragm causes external diaphragm wear and metal parts wear due to contact of these elements with the interior of the diaphragm compartment or housing. Also, if the cover plate is not guided to contact the striker plate squarely premature rupture of the diaphragm may result.

Having fully described the nature, method and objects of my invention, I claim:

1. In a diaphragm pump including a housing provided with a diaphragm separating the interior of said housing into a first chamber and a second chamber, the improvement comprising a valve body arranged in said first chamber, a guide rod secured to said diaphragm at one end thereof and provided with a flange at the other end thereof and slidably arranged in said valve body, a valve spool having first, second, and third positions provided with first and second spaced-apart recessed portions slidably arranged in said valve body, said valve body being provided with first, second, and third fluid passages, said first passage fluidly communicating with a source of fluid pressure, said second passage fluidly communicating said first chamber and said first recess when said valve spool is in said first position, said first recess fluidly communicating said first and second passages when said valve spool is in said second position, a check valve arranged in said third passage adapted to permit fluid flow from said second recess to said first chamber and to prevent fluid flow from said first chamber to said second recess, said second recess fluidly communicating said first and third passages when said valve spool is in said third position, first biasing means arranged on said valve spool adapted to urge said valve spool from said second to said first position, second biasing means arranged on said valve spool adapted to urge said valve spool from said third to said first position, movement of said diaphragm a selected distance in one direction causing said diaphragm to contact said valve spool to move said valve spool from said first to said third position to admit fluid to said first chamber and movement of said diaphragm a selected distance in another direction causing said flange to move said valve spool from said first to said second position to release fluid from said first chamber.

2. In a diaphragm pump including a housing provided with a flexible diaphragm separating the interior of said housing into a first chamber and a second chamber, the improvement comprising a valve body arranged in said first chamber, a valve spool having first, second, and third positions provided with first and second spaced-apart recess portions slidably arranged in said valve body, said valve body being provided with first, second, and third fluid passages, said first passage fluidly communicating with a source of fluid pressure, said second passage fluidly communicating said first chamber and said first recess when said valve spool is in said first position, said first recess fluidly communicating said first and second passages when said valve spool is in said second position, a check valve arranged in said third passage adapted to permit fluid flow from said second recess to said first chamber and to prevent fluid flow from said first chamber to said second recess, said second recess fluidly communicating said first and third passages when said valve spool is in said third position, first biasing means arranged on said spool adapted to urge said valve spool from said second to said first position, second biasing means arranged on said valve spool adapted to urge said valve spool from said third to said first position, and valve actuating means slidably arranged on said valve body adjacent to said valve spool connected to said diaphragm and adapted to engage said valve spool to move said valve spool from said first to said second position when said diaphragm moves a selected distance in one direction to discharge fluid from said first chamber via said second passage, said first recessed portion and said first psasage, movement of said diaphragm a selected distance in another direction causing said diaphragm to engage said valve spool to move said valve spool from said first to said third position to admit fluid to said first chamber via said first passage, said second recessed portion, said third passage, and said check valve.

3. In a diaphragm pump including a housing provided with a diaphragm separating the interior of said housing into a first chamber and a second chamber; the improvement comprising a valve body arranged in said first chamber; said valve body being provided with first, second, and third fluid passages, said first passage fluidly communicating with a source of fluid pressure, said third passage being provided with a check valve, valve means having first, second, and third positions slidably arranged on said valve body adapted to fluidly communicate said first and second passages when in said second position to exhaust fluid pressure from said first chamber to said source, to fluidly communicate said third passage and said first passage when in said third position to supply fluid pressure to said first chamber from said source, and to prevent fluid communication between said first passage and either of said first and second passages when in said first position to isolate said source from said first chamber, biasing means adapted to bias said valve means to said first position and valve actuator means connected to said diaphragm and slidably arranged on said valve body adapted to contact said valve means to move said valve means to said second position, said diaphragm being adapted to contact said valve means to move said valve means to said third position.

4. A device for injecting into and releasing from the intermediary fluid chamber of a diaphragm pump housing intermediary fluid comprising a movable diaphragm arranged in said housing, a valve assembly arranged in said chamber and having a fluid reservoir connected thereto, said valve assembly being provided with movable means having first, second, and third positions, and one way fluid directing means adapted to permit fluid flow to said chamber and to prevent fluid flow from said chamber, fluid movement between said reservoir and said chamber being prevented when said movable means is in said first position, fluid movement from said reservoir to said chamber being permitted and fluid movement from said chamber to said reservoir being prevented when said movable means is in said third position and fluid movement from said chamber to said reservoir being permitted when said movable means is in said second position and means connected to the diaphragm and movable therewith adapted to move said movable means from said first to said second position when the chamber is overcharged with intermediary fluid, said diaphragm being adapted to contact said movable means to move said movable means to said third position when said chamber has a shortage of intermediary fluid.

References Cited in the file of this patent
UNITED STATES PATENTS

| 1,954,534 | Norton | Apr. 10, 1934 |
| 2,207,226 | Schmidt | July 9, 1940 |
| 2,703,055 | Veth et al. | Mar. 1, 1955 |
| 2,778,315 | Crookston et al. | Jan. 22, 1957 |